US008308380B2

(12) United States Patent
Youn

(10) Patent No.: US 8,308,380 B2
(45) Date of Patent: Nov. 13, 2012

(54) LENS BARREL ASSEMBLY

(75) Inventor: Yeo-tak Youn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/151,464

(22) Filed: Jun. 2, 2011

(65) Prior Publication Data
US 2012/0039595 A1 Feb. 16, 2012

(30) Foreign Application Priority Data

Aug. 13, 2010 (KR) .................. 10-2010-0078487

(51) Int. Cl.
G03B 17/00 (2006.01)
G02B 7/02 (2006.01)
(52) U.S. Cl. .................. 396/531; 359/828; 359/830
(58) Field of Classification Search .................. 396/529, 396/531; 348/340; 359/819, 827, 828, 830
See application file for complete search history.

(56) References Cited

U.S. PATENT DOCUMENTS
2010/0014851 A1* 1/2010 Furuyama et al. ............ 396/531

FOREIGN PATENT DOCUMENTS
JP 2008-015017 A 1/2008
KR 1020090085992 A 8/2009
* cited by examiner Primary Examiner — Rochelle-Ann J Blackman
(74) Attorney, Agent, or Firm — Drinker Biddle & Reath LLP

(57) ABSTRACT

A lens barrel assembly that is attached to and detached from a camera includes: a lens barrel, which surrounds a lens and includes an inlet through which an external light enters; and an outlet through which light, which has passed through the lens, exits; a rotating unit, which is attached to the lens barrel such that the rotating unit rotates in a circumferential direction of the lens barrel; a shield plate, which has a first side rotatably connected to the rotating unit and a second side rotatably connected to the lens barrel and moves between a position of closing the outlet and a position of opening the outlet as the rotating unit rotates; and a driving unit, which contacts the camera when the lens barrel is attached to the camera, generates rotation force from friction force, and rotates the rotating unit.

10 Claims, 5 Drawing Sheets

# LENS BARREL ASSEMBLY

CROSS-REFERENCE TO RELATED PATENT APPLICATION

This application claims the priority benefit of Korean Patent Application No. 10-2010-0078487, filed on Aug. 13, 2010, in the Korean Intellectual Property Office, the disclosure of which is incorporated herein in its entirety by reference.

BACKGROUND

1. Field of the Invention

Embodiments relate to a lens barrel assembly, and more particularly, to a lens barrel assembly including a shield plate, which operates automatically in linkage with attaching or detaching of the lens barrel assembly to a photographing device for protecting a lens.

2. Description of the Related Art

From among photographing devices, such as digital cameras, models to which lens barrel assemblies are detachably attached are widely used. Users of such photographing devices use lens barrel assemblies having various functions according to photographing purposes, and selectively attach lens barrel assemblies required for photographing to the photographing devices or detach lens barrel assemblies from the photographing devices.

A lens barrel assembly includes lens groups, wherein the lens groups should be protected from foreign substances from outside, such as dust. When a protective cover is attached to a front side of a lens barrel assembly toward an object, the influx of foreign substances may be blocked. However, a rear side of the lens barrel assembly to be attached to a photographing device is directly exposed to an outside environment.

Although a protective cover may be attached to the rear side of the lens barrel assembly, the number of protective covers to be handled to use a photographing device increases. Furthermore, a series of operations for attaching a lens barrel assembly, including holding a lens barrel assembly, removing a protective cover, and attaching the lens barrel assembly to a photographing device are complex and require several seconds. Furthermore, even if a protective cover is attached to the rear side of the lens barrel assembly, foreign substances may enter into the lens barrel assembly when the lens barrel assembly is attached to a photographing device in environments with strong winds or a large amount of dust.

SUMMARY

Embodiments include a lens barrel assembly for protecting a lens from foreign substances.

Embodiments also include a lens barrel assembly including a shield plate that automatically operates for protecting a lens.

Embodiments also include a lens barrel assembly including a shield plate that operates in linkage with attachment or detachment of the lens barrel assembly.

According to an embodiment, a lens barrel assembly that is attached to and detached from a camera includes: a lens barrel, which surrounds a lens and includes an inlet through which an external light enters; and an outlet through which light, which has passed through the lens, exits; a rotating unit, which is attached to the lens barrel such that the rotating unit rotates in a circumferential direction of the lens barrel; a shield plate, which has a first side rotatably connected to the rotating unit and a second side rotatably connected to the lens barrel and moves between a position of closing the outlet and a position of opening the outlet as the rotating unit rotates; and a driving unit, which contacts the camera when the lens barrel is attached to the camera, generates rotation force from friction force, and rotates the rotating unit.

The lens barrel assembly may further include an elastic supporting unit, which is arranged between the rotating unit and the lens barrel and provides elasticity to the rotating unit in a direction against a direction in which the rotating unit rotates.

The shield plate may be pressed by elasticity transmitted from the elastic supporting unit toward the position of closing the outlet.

The driving unit may include a roller, which is arranged on the lens barrel to contact an attachment mount of the camera and rotate by friction force; and a driving force transmitting unit, which transmits rotation force of the roller to the rotating unit.

The roller may be arranged to be exposed from an end of the lens barrel toward the attachment mount.

The driving force transmitting unit may include a first gear assembly, which is installed to the rotation shaft of the roller; and a second gear assembly, which is arranged between the first gear assembly and a gear surface formed outside the rotating unit, is rotated by the first gear assembly, and transmits rotation force to the gear surface.

The first gear assembly and the second gear assembly may form a bevel gear assembly.

The rotating unit may be formed in a shape of a ring that is rotatably attached to the lens barrel.

An end of the lens barrel may be inserted to the attachment mount of the camera, the lens barrel may include an opening for exposing the outer surface of the rotating unit toward a side surface of the attachment mount, and the driving unit may be attached to the outer surface of the rotating unit toward the attachment mount to contact the side surface of the attachment mount and to generate friction force.

An end of the lens barrel may be inserted to the attachment mount of the camera, the lens barrel may include an opening for exposing the outer surface of the rotating unit to a side surface of the attachment mount, the driving unit may include a roller, which is rotatably arranged between the side surface of the attachment mount and the outer surface of the rotating unit in the opening, and the driving unit may be attached to the outer surface of the rotating unit toward the attachment mount to contact the side surface of the attachment mount and to generate friction force.

BRIEF DESCRIPTION OF THE DRAWINGS

The above and other features and advantages will become more apparent by describing in detail exemplary embodiments with reference to the attached drawings in which.

DETAILED DESCRIPTION

The attached drawings for illustrating embodiments are referred to in order to gain a sufficient understanding of the embodiments, the merits thereof, and the objectives accomplished by the implementation of the embodiments.

Figure 1:
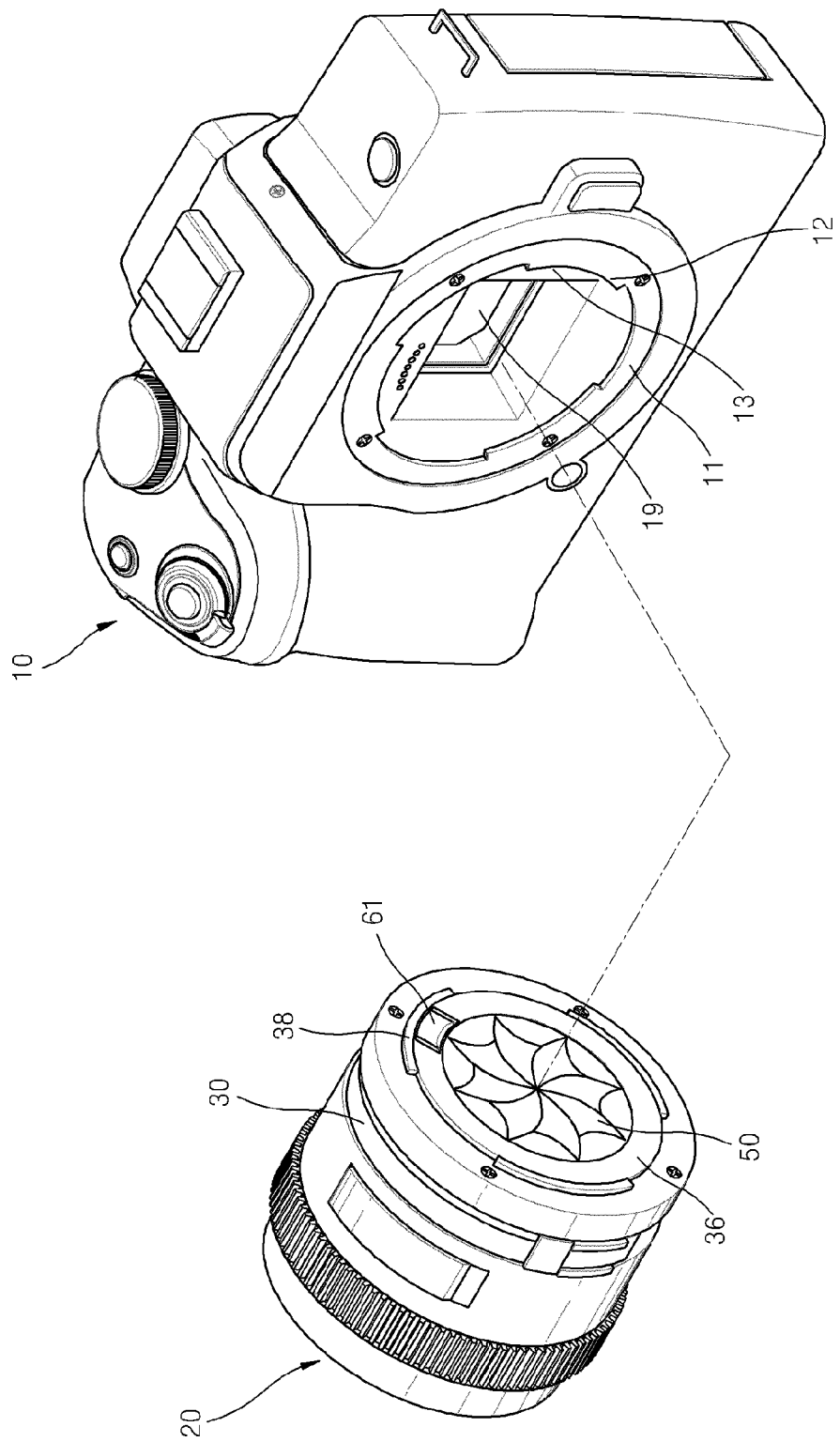
FIG. 1 is a perspective view of operation of a lens barrel assembly, according to an embodiment.
Figure 2:
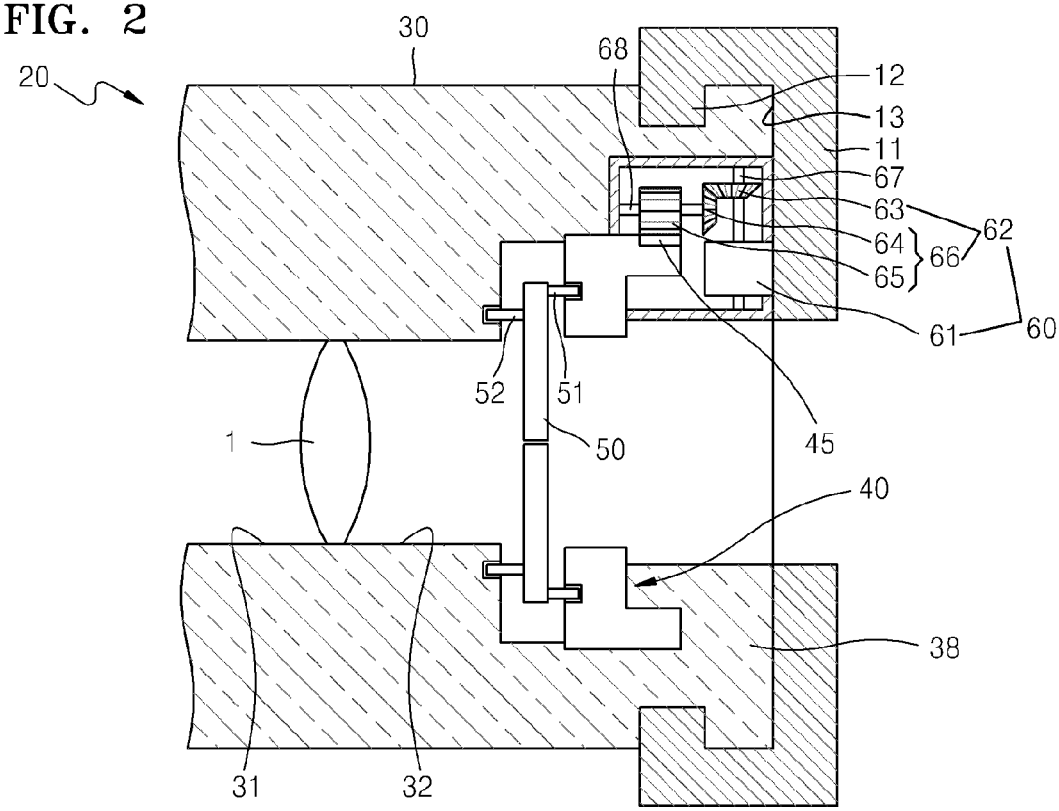
FIG. 2 is a lateral sectional view of a portion of the lens barrel assembly of FIG. 1.

FIG. 1 is a perspective view of operation of a lens barrel assembly 20, according to an embodiment, and FIG. 2 is a lateral sectional view of a portion of the lens barrel assembly 20 of FIG. 1.

The lens barrel assembly 20 shown in FIGS. 1 and 2 may be detachably attached to an attachment mount 11 of a camera 10.

The lens barrel assembly 20 may include a lens barrel 30 having an inlet 31, which surrounds a lens 1 and through which external light enters, and an outlet 32, through which light that has passed through the lens 1 exits, a rotating unit 40 attached to the lens barrel 30, a shield plate 50, which may be connected to the lens barrel 30 and the rotating unit 40 and may move, and a driving unit 60, which rotates the rotating unit 40.

Light that has passed through the lens barrel 30 forms an image on an imaging device 19 in the camera 10 via the lens 1. Therefore, when the lens barrel assembly 20 is attached to the camera 10, the outlet 32 of the lens barrel 30 opens. When the lens barrel assembly 20 is detached from the camera 10, the outlet 32 of the lens barrel 30 closes to block foreign substances from the lens 1. The outlet 32 of the lens barrel 30 may be opened and closed by the shield plate 50.

The rotating unit 40 is attached to the lens barrel 30 such that the rotating unit 40 may move in a circumferential direction of the lens barrel 30. The rotating unit 40 is connected to the driving unit 60 and may rotate using rotation force from the driving unit 60. The rotating unit 40 may be formed in a ring shape, and a gear surface 45 is formed on an outer surface of the rotating unit 40.

A first side of the shield plate 50 for opening and closing the outlet 32 of the lens barrel 30 is rotatably connected to the rotating unit 40 via a first hinge pin 51. A second side of the shield plate 50 is rotatably connected to the lens barrel 30 via a second hinge pin 52. Therefore, as the rotating unit 40 rotates with respect to the lens barrel 30, the shield plate 50 rotates around the first hinge pin 51 and the second hinge pin 52, and thus the outlet 32 of the lens barrel 30 may be opened or closed.

The driving unit 60 generates rotation force due to friction by contacting the attachment mount 11 of the camera 10 when the lens barrel 30 is attached to the attachment mount 11 of the camera 10 and transmits the rotation force to the rotating unit 40.

The driving unit 60 includes a roller 61, which is arranged on the lens barrel 30 to contact the attachment mount 11 of the camera 10 and rotate by using friction force, and a driving force transmitting unit 62, which transmits the rotation force of the roller 61 to the rotating unit 40.

Since the roller 61 is arranged to be exposed from a rear side 36 of the lens barrel 30 toward the attachment mount 11 of the camera 10, when the lens barrel assembly 20 rotates while the lens barrel assembly 20 is inserted to the attachment mount 11, the roller 61 contacts a supporting surface 13 of the attachment mount 11 and rotates by friction force. Since an attachment wing 38 is exposed at edges of the rear side 36 of the lens barrel 30, when the lens barrel 30 rotates after being inserted to the attachment mount 11 of the camera 10, the attachment wing 38 combines with a supporting wing 12 of the attachment mount 11.

The driving force transmitting unit 62 includes a first gear assembly 63, which is installed to a rotation shaft 67 of the roller 61, and second gear assembly 66, which is arranged between the first gear assembly 63 and the gear surface 45 formed outside the rotating unit 40, is rotated by the first gear assembly 63, and transmits rotation force to the gear surface 45. The second gear assembly 66 includes an intermediate gear 64, which is attached to a rotation shaft 68 rotatably installed to the lens barrel 30 and interlocks the first gear assembly 63, and a transmission gear 65, which is attached to the same rotation shaft 68 and interlocks the gear surface 45.

The first gear assembly 63 and the second gear assembly 66 form a bevel gear assembly to switch directions in which the roller 61 rotates and to rotate the rotating unit 40 in a narrow space.

When the roller 61 contacts the supporting surface 13 of the attachment mount 11 and rotates by friction force, the rotation force of the roller 61 is transmitted to the intermediate gear 64 and the transmission gear 65 via the first gear assembly 63. Since the transmission gear 65 interlocks the gear surface 45 of the rotating unit 40, the rotating unit 40 may rotate by using the rotation force transmitted by the transmission gear 65.

Figure 3:
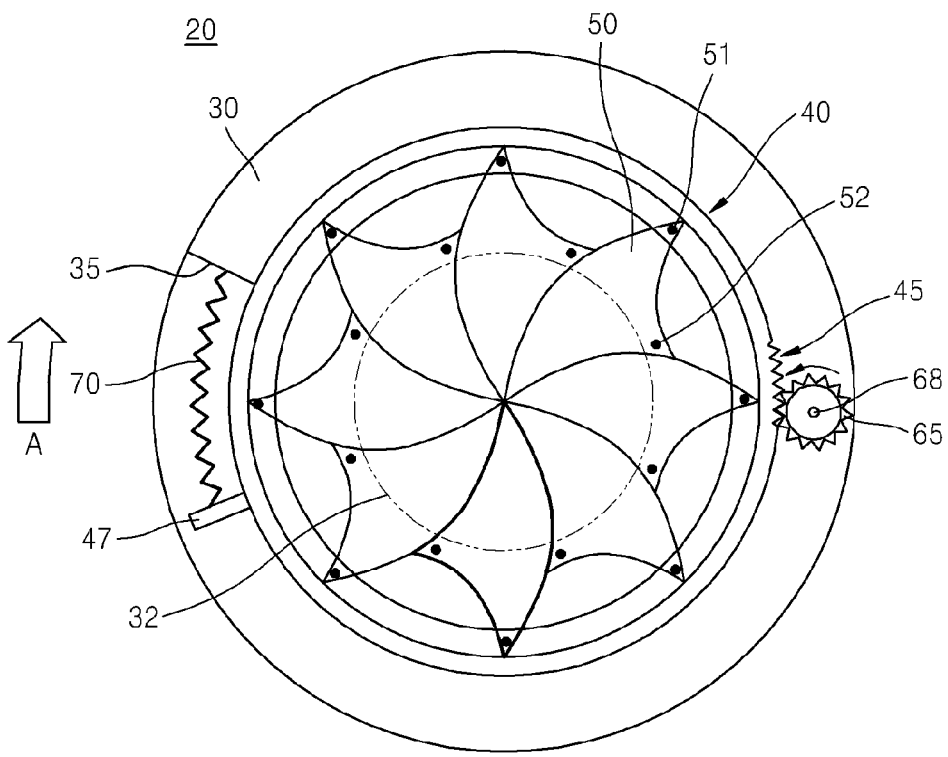
FIG. 3 is a rear view of a portion of the lens barrel assembly of FIG. 1.
Figure 4:
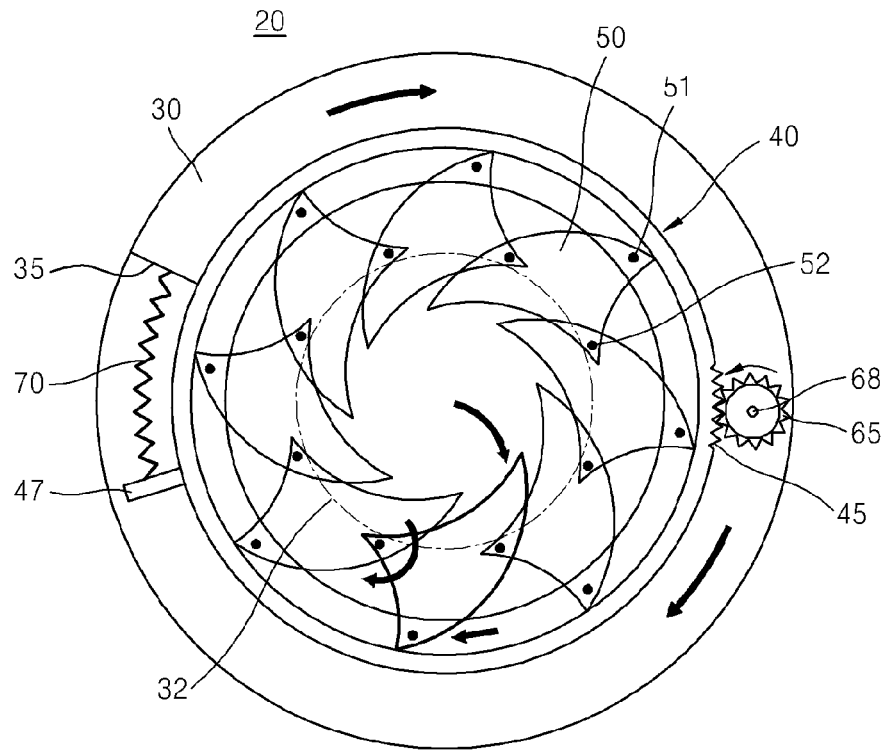
FIG. 4 is a rear view showing movement of a shield plate in the lens barrel assembly of FIG. 3.
Figure 5:
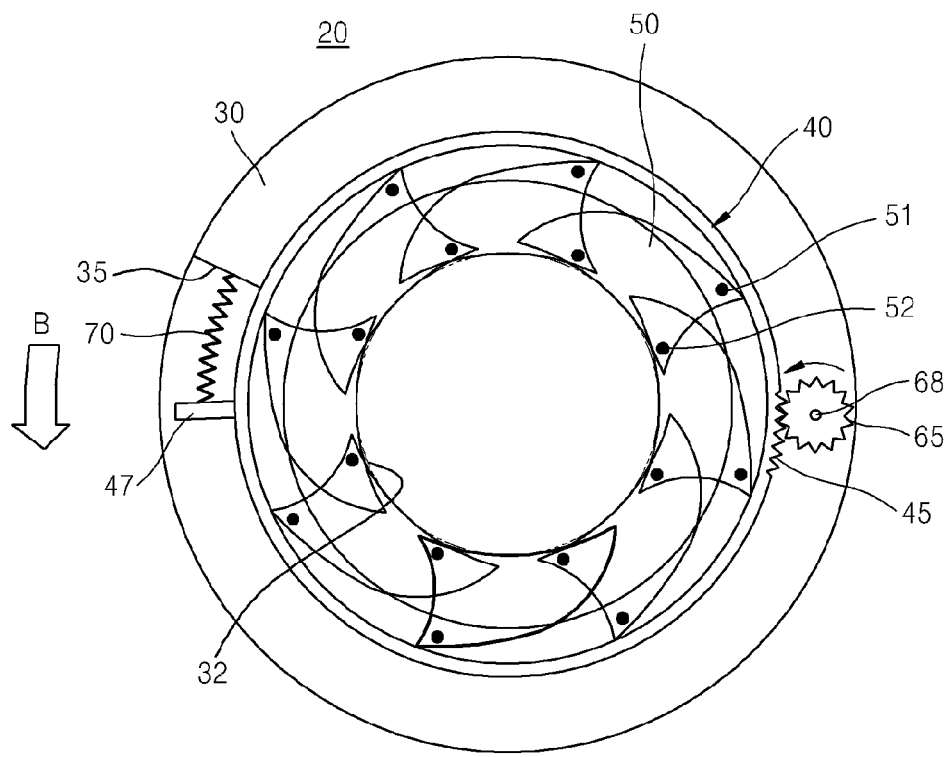
FIG. 5 is a rear view showing that the shield plate is moved to a position of opening an outlet of the lens barrel assembly of FIG. 3.

FIG. 3 is a rear view of a portion of the lens barrel assembly 20 of FIG. 1. FIG. 4 is a rear view showing movement of the shield plate 50 in the lens barrel assembly 20 of FIG. 3. FIG. 5 is a rear view showing that the shield plate 50 is moved to a position of opening the outlet 32 of the lens barrel assembly 20.

In the lens barrel assembly 20 shown in FIG. 3, the shield plate 50 is at a position of closing the outlet 32. As the rotating unit 40 rotates, the shield plate 50 may rotate as shown in FIG. 4 and move to the position of opening the outlet 32 as shown in FIG. 5.

The lens barrel assembly 20 may include an elastic supporting unit 70, which is arranged between the rotating unit 40 and the lens barrel 30 and provides elasticity to the rotating unit 40. Although a compressed spring is used as the elastic supporting unit 70 in the present embodiment, this should not be construed as limiting, and other types of mechanical elements, such as a gas spring or a liquid spring, may be used as the elastic supporting unit 70.

A first end of the elastic supporting unit 70 is attached to a supporting surface 35 of the lens barrel 30, whereas a second end of the elastic supporting unit 70 is attached to a protrusion 47, which protrudes from the outer surface of the rotating unit 40. The rotating unit 40 may rotate in the direction indicated with an arrow A in FIG. 3.

Since the first end of the elastic supporting unit 70 is supported by the supporting surface 35 of the lens barrel 30, the elastic supporting unit 70 may provide elasticity to the rotating unit 40 in the counterclockwise direction, that is, a direction opposite to the direction in which the rotating unit 40 rotates. Therefore, when the lens barrel assembly 20 is detached from the camera 10, the shield plate 50 may maintain the position of closing the outlet 32 of the lens barrel 30 due to operation of the elastic supporting unit 70.

When the rotating unit 40 rotates and the shield plate 50 opens the outlet 32 of the lens barrel 30 as shown in FIG. 5, the elastic supporting unit 70 is compressed, and thus the elastic supporting unit 70 provides elasticity to the rotating unit 40 in the direction indicated with an arrow B. Therefore, when the lens barrel assembly 20 is detached from the camera 10, the rotating unit 40 is automatically rotated by the elastic supporting unit 70 and the shield plate 50 may move to the position of closing the outlet 32.

Figure 6:
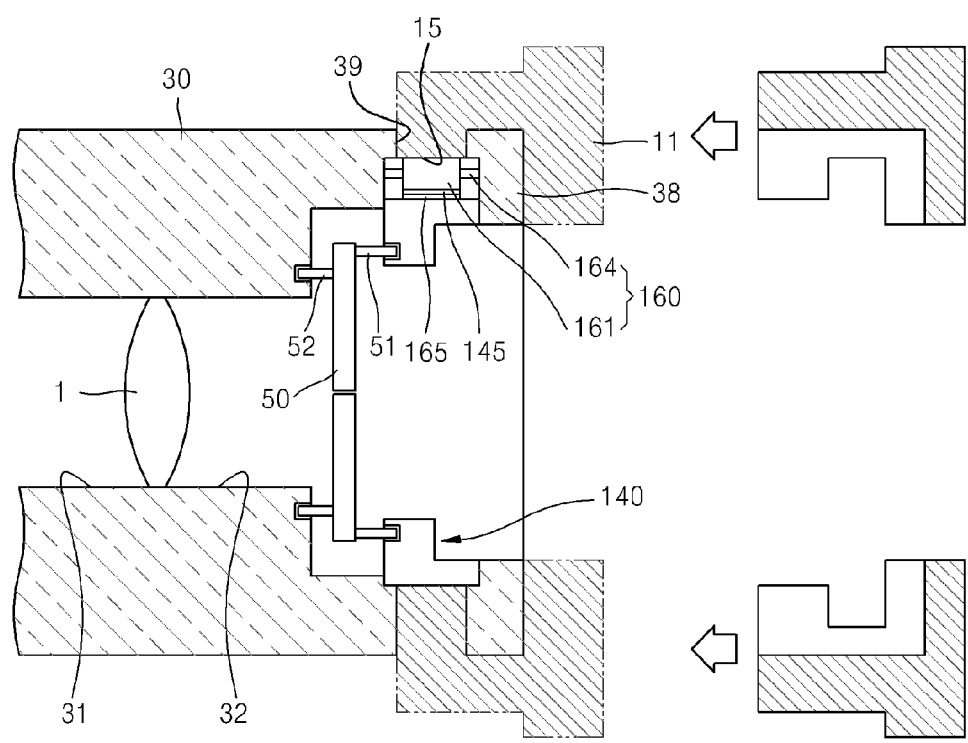
FIG. 6 is a lateral sectional view of a portion of a lens barrel assembly, according to another embodiment.

FIG. 6 is a lateral sectional view of a portion of a lens barrel assembly, according to another embodiment.

The lens barrel assembly according to the present embodiment shown in FIG. 6 includes the lens barrel 30, which includes the inlet 31 and the outlet 32 and surrounds the lens 1, a rotating unit 140, which is rotatably attached to the lens barrel 30, the shield plate 50, which is arranged between the rotating unit 140 and the lens barrel 30 and opens or closes the outlet 32, and a driving unit 160, which rotates the rotating unit 140.

The rotating unit 140 is combined to the lens barrel 30 such that the rotating unit 140 may rotate in a circumferential direction of the lens barrel 30. The rotating unit 140 is connected to the driving unit 160 and may rotate by using rotation force transmitted from the driving unit 160. The rotating unit 140 may be formed in a ring shape, and a second gear surface 145 is formed on the outer surface of the rotating unit 140.

The first side of the shield plate 50 for opening and closing the outlet 32 of the lens barrel 30 is rotatably connected to the rotating unit 140 via the first hinge pin 51. The second side of the shield plate 50 is rotatably connected to the lens barrel 30 via the second hinge pin 52. Therefore, as the rotating unit 140 rotates with respect to the lens barrel 30, the shield plate 50 rotates around the first hinge pin 51 and the second hinge pin 52, and thus the outlet 32 of the lens barrel 30 may be opened or closed.

The attachment wing 38 at edges of the lens barrel 30 is inserted to the attachment mount 11 of a camera, and the lens barrel 30 includes an opening 39 for exposing the outer surface of the rotating unit 140 toward a side surface 15 of the attachment mount 11.

The driving unit 160 includes a roller 161, which is rotatably arranged between the side surface 15 of the attachment mount 11 and the outer surface of the rotating unit 40, and a rotation shaft 164, which rotatably supports the roller 161. The roller 161 includes a first gear surface 165 on the outer surface of the roller 161. Since a second gear surface 145 on the outer surface of the rotating unit 140 interlocks with the first gear surface 165, rotation force of the roller 161 may be transmitted to the rotating unit 140 via the first gear surface 165 and the second gear surface 145.

Although no elastic supporting unit is shown in FIG. 6, an elastic supporting unit may be arranged as in the embodiment shown in FIGS. 3 through 5. The elastic supporting unit may provide elasticity to the rotating unit 140 to rotate with respect to the lens barrel 30, and thus the lens barrel 30 may automatically rotate when the lens barrel 30 is detached from the attachment mount 11.

Figure 7:
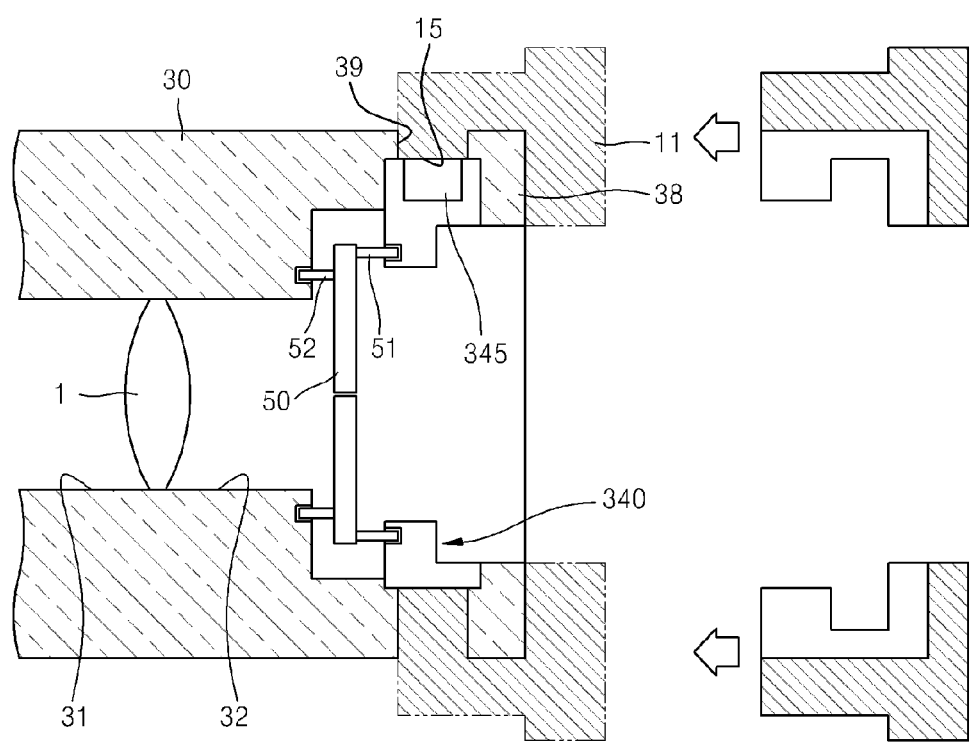
FIG. 7 is a lateral sectional view of a portion of a lens barrel assembly, according to another embodiment.

FIG. 7 is a lateral sectional view of a portion of a lens barrel assembly, according to another embodiment.

The lens barrel assembly according to the present embodiment shown in FIG. 7 includes the lens barrel 30, which includes the inlet 31 and the outlet 32 and surrounds the lens 1, a rotating unit 340, which is rotatably attached to the lens barrel 30, the shield plate 50, which is arranged between the rotating unit 340 and the lens barrel 30 and opens or closes the outlet 32, and a driving unit 345, which rotates the rotating unit 340.

The rotating unit 340 is formed in a ring shape, and is combined to the lens barrel 30 such that the rotating unit 340 may rotate in a circumferential direction of the lens barrel 30. The driving unit 345 is arranged on the outer surface of the rotating unit 340, and the rotating unit 340 may rotate by using rotation force generated by the driving unit 345.

The first side of the shield plate 50 for opening and closing the outlet 32 of the lens barrel 30 is rotatably connected to the rotating unit 340 via the first hinge pin 51. The second side of the shield plate 50 is rotatably connected to the lens barrel 30 via the second hinge pin 52. Therefore, as the rotating unit 340 rotates with respect to the lens barrel 30, the shield plate 50 rotates around the first hinge pin 51 and the second hinge pin 52, and thus the outlet 32 of the lens barrel 30 may be opened or closed.

The attachment wing 38 at edges of the lens barrel 30 is inserted to the attachment mount 11 of a camera, and the lens barrel 30 includes an opening 39 for exposing the outer surface of the rotating unit 340 to the side surface 15 of the attachment mount 11.

The driving unit 345 may be formed of a material, such as rubber or synthetic resin, and is arranged on the outer surface of the rotating unit 340 facing the side surface 15 of the attachment mount 11. When the lens barrel 30 is inserted to the attachment mount 11 of a camera and rotates, the driving unit 345 contacts the side surface 15 of the attachment mount 11, and thus the rotation unit 340 rotates by using friction force between the side surface 15 of the attachment mount 11 and the driving unit 345.

Although no elastic supporting unit is shown in FIG. 7, an elastic supporting unit may be arranged as in the embodiment shown in FIGS. 3 through 5. The elastic supporting unit may provide elasticity to the rotating unit 340 to rotate with respect to the lens barrel 30, and thus the rotating unit 340 may automatically rotate when the lens barrel 30 is detached from the attachment mount 11.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The lens barrel assembly described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A lens barrel assembly that is attached to and detached from a camera, the lens barrel assembly comprising:
    a lens barrel, which surrounds a lens and comprises:
        an inlet through which an external light enters; and
        an outlet through which light, which has passed through the lens, exits;
    a rotating unit, which is attached to the lens barrel such that the rotating unit rotates in a circumferential direction of the lens barrel;
    a shield plate, which has a first side rotatably connected to the rotating unit and a second side rotatably connected to the lens barrel, and moves between a position of closing the outlet and a position of opening the outlet as the rotating unit rotates; and
    a driving unit, which contacts the camera when the lens barrel is attached to the camera, generates rotation force from friction force between the driving unit and the camera, and rotates the rotating unit.

2. The lens barrel assembly of claim 1, further comprising an elastic supporting unit, which is arranged between the rotating unit and the lens barrel and provides elasticity to the rotating unit in a direction against a direction in which the rotating unit rotates.

3. The lens barrel assembly of claim 2, wherein the shield plate is pressed by elasticity transmitted from the elastic supporting unit toward the position of closing the outlet.

4. The lens barrel assembly of claim 1, wherein the driving unit comprises:
    a roller, which is arranged on the lens barrel to contact an attachment mount of the camera and rotate by friction force; and
    a driving force transmitting unit, which transmits rotation force of the roller to the rotating unit.

5. The lens barrel assembly of claim 4, wherein the roller is arranged to be exposed from an end of the lens barrel toward the attachment mount.

6. The lens barrel assembly of claim 5, wherein the driving force transmitting unit comprises:
    a first gear assembly, which is installed to the rotation shaft of the roller; and
    a second gear assembly, which is arranged between the first gear assembly and a gear surface formed outside the rotating unit, is rotated by the first gear assembly, and transmits rotation force to the gear surface.

7. The lens barrel assembly of claim 6, wherein the first gear assembly and the second gear assembly form a bevel gear assembly.

8. The lens barrel assembly of claim 1, wherein the rotating unit is formed in a shape of a ring that is rotatably attached to the lens barrel.

9. The lens barrel assembly of claim 8, wherein an end of the lens barrel is inserted to an attachment mount of the camera,
    the lens barrel comprises an opening for exposing the outer surface of the rotating unit toward a side surface of the attachment mount, and
    the driving unit is attached to the outer surface of the rotating unit toward the attachment mount to contact the side surface of the attachment mount and to generate friction force.

10. The lens barrel assembly of claim 8, wherein an end of the lens barrel is inserted to the attachment mount of the camera, the lens barrel comprises an opening for exposing the outer surface of the rotating unit to a side surface of the attachment mount, the driving unit comprises a roller, which is rotatably arranged between the side surface of the attachment mount and the outer surface of the rotating unit in the opening, and the driving unit is attached to the outer surface of the rotating unit toward the attachment mount to contact the side surface of the attachment mount and to generate friction force.

* * * * *